(12) United States Patent
Hoebrechts

(10) Patent No.: US 6,464,053 B1
(45) Date of Patent: Oct. 15, 2002

(54) SINGLE PIECE PISTON

(75) Inventor: Albert Hoebrechts, Heers (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 0 days.

(21) Appl. No.: 09/360,570

(22) Filed: Jul. 26, 1999

(51) Int. Cl.$^7$ ................................ F16F 9/46; F16F 9/34
(52) U.S. Cl. ............................ 188/322.15; 188/282.5
(58) Field of Search ..................... 188/322.15, 282.5

(56) References Cited

U.S. PATENT DOCUMENTS

| | | | |
|---|---|---|---|
| 3,003,596 A | 10/1961 | de Carbon | |
| 3,113,644 A | 12/1963 | Wossner | |
| 3,134,460 A | 5/1964 | de Carbon | |
| 3,470,986 A | 10/1969 | Whisler, Jr. | |
| 3,827,538 A | 8/1974 | Morgan | |
| 4,467,899 A | 8/1984 | Molders et al. | |
| 4,646,883 A | 3/1987 | Tanaka | |
| 4,809,829 A | 3/1989 | Hummel et al. | |
| 4,830,152 A | 5/1989 | Rauert et al. | |
| 4,895,229 A * | 1/1990 | Kato | 188/322.15 |
| 4,899,855 A | 2/1990 | de Carbon | |
| 4,905,799 A | 3/1990 | Yamaoka et al. | |
| 4,964,493 A | 10/1990 | Yamaura et al. | |
| 4,993,524 A | 2/1991 | Grundei | |
| 5,042,624 A | 8/1991 | Furuya et al. | |
| 5,070,971 A | 12/1991 | Dourson et al. | |
| 5,072,812 A * | 12/1991 | Imaizumi | 188/322.15 |
| 5,115,892 A | 5/1992 | Yamaoka et al. | |
| 5,219,414 A | 6/1993 | Yamaoka | |
| 5,226,512 A | 7/1993 | Kanari | |
| 5,259,294 A | 11/1993 | May | 188/322.15 |
| 5,277,283 A | 1/1994 | Yamaoka et al. | |
| 5,316,113 A | 5/1994 | Yamaoka | |
| 5,409,090 A * | 4/1995 | Kashiwagi et al. | 188/322.15 |
| 5,413,195 A * | 5/1995 | Murakami | 188/322.15 |
| 5,497,862 A | 3/1996 | Hoya | |
| 5,927,445 A * | 7/1999 | Huang et al. | 188/322.15 |
| 6,039,159 A * | 3/2000 | Ohlin et al. | 188/322.15 |

FOREIGN PATENT DOCUMENTS

| | | | |
|---|---|---|---|
| DE | 40 33 410 A1 | 4/1992 | 188/322.15 |
| EP | 0 282 842 A1 | 3/1988 | |
| EP | 0 407 865 A2 | 7/1990 | 188/322.15 |
| EP | 0 505 773 A1 | 3/1992 | |
| EP | 0 557 548 A1 | 9/1993 | |
| EP | 0 557 548 B1 | 10/1994 | |
| EP | 0 658 611 A1 | 6/1995 | |
| FR | 1185696 | 2/1959 | |
| JP | A 60-17869 | 1/1985 | |
| JP | 0283928 | * 11/1990 | 188/322.15 |

* cited by examiner

*Primary Examiner*—Matthew C. Graham
(74) *Attorney, Agent, or Firm*—Harness, Dickey & Pierce, PLC

(57) ABSTRACT

A damper assembly includes a piston assembly which has a piston body which is designed to be manufactured from a powdered metal process. In one embodiment, the compression and extension passages are generally S-shaped with their inlets being disposed radially outward from their outlets. In this manner, compression and extension check valves can be designed to only extend radially to cover the outlets and not affect the inlets. In another embodiment, the compression and extension passages are straight and the compression and extension sealing lands wind around between the inlets and the outlets so only the outlets are sealed and the inlets are not affected.

13 Claims, 5 Drawing Sheets

SINGLE PIECE PISTON

FIELD OF THE INVENTION

The present invention relates generally to hydraulic dampers or shock absorbers adapted for use in a suspension system such as the suspension systems used for automotive vehicles. More particularly, the present invention relates to a single piece piston having a sealing land design and a fluid passage design which allow manufacture of the single piece piston by powdered metal processes.

BACKGROUND OF THE INVENTION

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of tile vehicle. The piston is connected to the sprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle of the vehicle. In a dual tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As stated above, the valving on the piston limits the flow of damping fluid between the upper and lower working chambers when the shock absorber is compressed or extended. During driving, the suspension system moves in jounce (compression) and rebound (extension). During jounce movements, the shock absorber is compressed causing damping fluid to move through the piston from the lower working chamber to the upper working chamber. A one-way check valve is normally located on the upper side of the piston to control the flow of damping fluid and thus the damping force created. During rebound movements, the shock absorber is extended causing damping fluid to move through the piston from the upper working chamber to the lower working chamber. A one-way check valve is normally located on the lower side of the piston to control the flow of damping fluid and thus the damping force created.

The piston normally includes a plurality of compression passages and a plurality of extension passages extending through the body of the piston. The compression check valve on the upper side of the piston opens the compression passages during jounce or compression movements of the shock absorber and closes the compression passages during rebound or extension movements of the shock absorber. Similarly, the extension check valve on the lower side of the piston opens the extension passages during rebound or extension movements of the shock absorber and closes the extension passages during jounce or compression movements of the shock absorber. Thus, the compression check valve must not interfere with the inlet to the extension passages and the extension check valve must not interfere with the inlet to the compression passages.

In order to avoid interference between the check valves and their opposing fluid passages, various non-interference methods have been designed into the piston. One method is to incorporate a radial offset between the compression passages and the extension passages. In this manner, one inlet is located radially outward of its opposing check valve and the opposite inlet is located radially inward of its opposing check valve. Another method is to angle the compression passages in one direction while angling the extension passages in the opposite direction. In this manner, both sets of inlets are located radially inward and both sets of outlets are located radially outward.

While the various methods for avoiding interference between the check valves and their opposing fluid passages have met with commercial success, continued development of shock absorber pistons includes development of lower cost systems enabling lower cost manufacturing for the piston itself, the valving system and thus the cost for the shock absorber.

SUMMARY OF THE INVENTION

The present invention provides the art with a single piece piston design which has an upper side which is identical to its lower side but rotated 45° from each other. The sealing lands on each side of the piston have a unique shape which eliminates interference between the check valves and their opposing passages. In one embodiment, the passages are formed in an S shape and in a second embodiment, the passages are formed straight. Both embodiments enable the single piece piston to be manufactured by powered metal processes.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
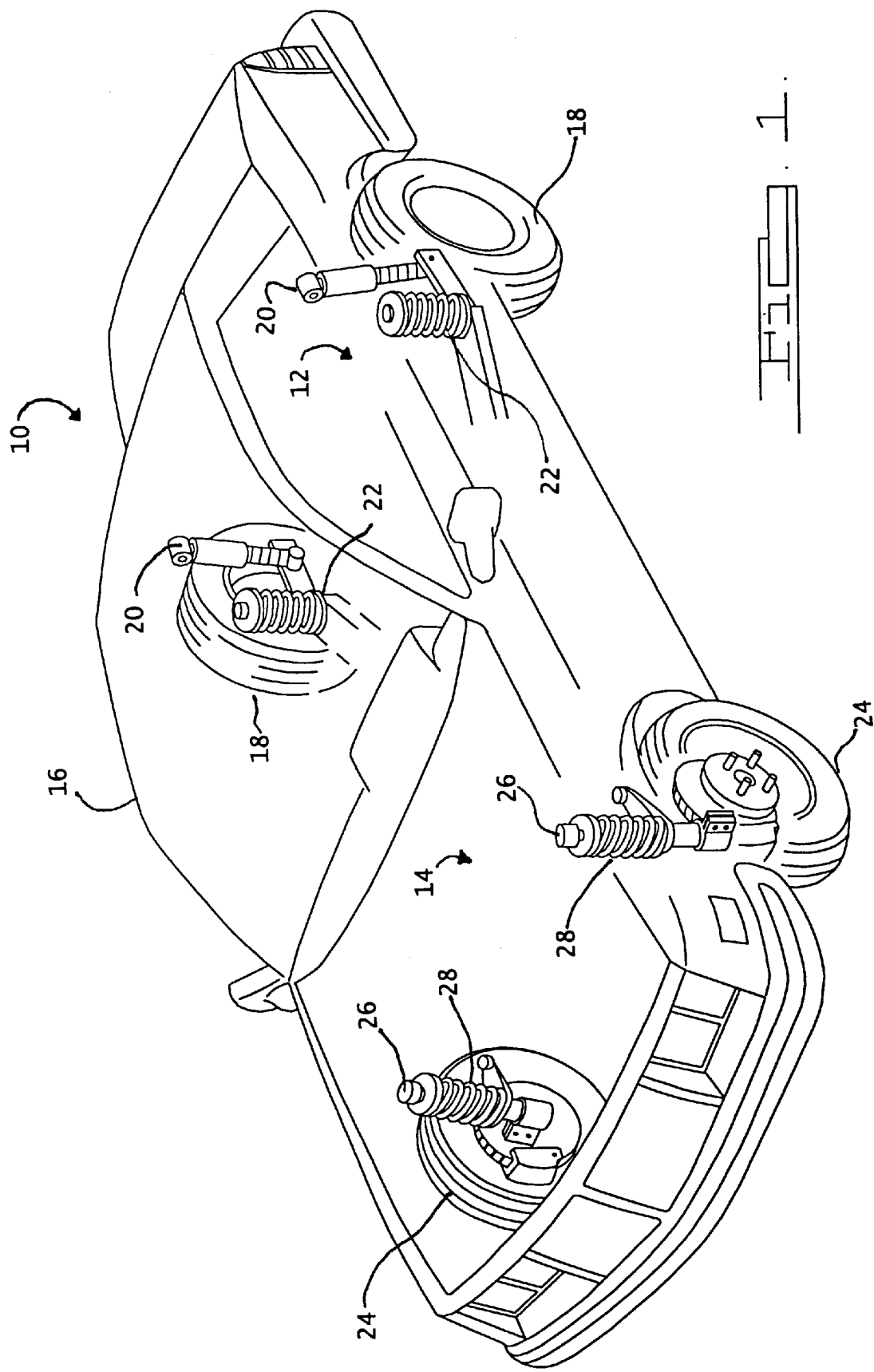
FIG. 1 is an illustration of an automobile having shock absorbers which incorporate the unique piston design in accordance with the present invention.

Referring now to the drawings in which like reference numerals designate like or corresponding parts throughout the several views, there is shown in FIG. 1 a vehicle incorporating a suspension system having shock absorbers each of which includes a piston in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and a first pair of helical coil springs 22. Similarly, front suspension 14 includes a transversely extending front axle assembly (not shown) to operatively support a pair of front wheels 24. The front axle assembly is attached to body 16 by means of a second pair of shock absorbers 26 and by a pair of helical coil springs 28. Shock absorbers 20 and 26 serve to dampen the relative motion of the unsprung portion (i.e., front and rear suspension 12 and 14, respectively) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include MacPherson struts.

Figure 2:
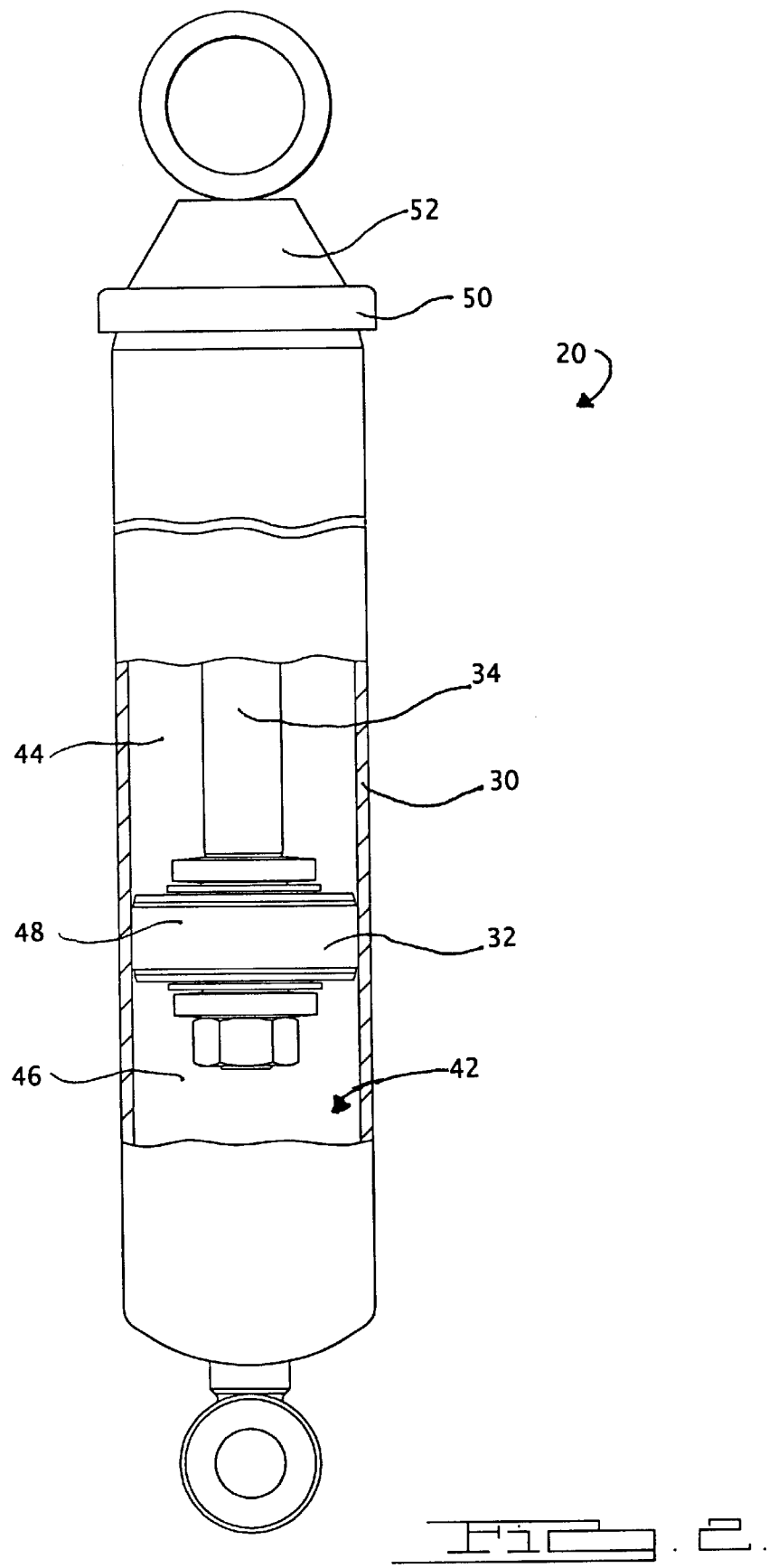
FIG. 2 is a side view, partially in cross section, of a shock absorber incorporating the unique piston design in accordance with the present invention.

Referring now to FIG. 2, shock absorber 20 is shown in greater detail. While FIG. 2 shows only shock absorber 20, it is to be understood that shock absorber 26 also includes the unique piston in accordance with the present invention. Shock absorber 26 only differs from shock absorber 20 in the way it is adapted to be connected to the sprung and unsprung portions of vehicle 10. Shock absorber 20 comprises a pressure tube 30, a piston assembly 32 and a piston rod 34.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap or rod guide 50 which closes the upper end of both pressure tube 30. A sealing system 52 seals the interface between rod guide 50, pressure tube 30 and piston rod 34. The end of piston rod 34 opposite to piston assembly 32 is adapted to be secured to the sprung portion of vehicle 10. The end of pressure tube 30 opposite to rod guide 50 is adapted to be connected to the unsprung portion of vehicle 10. Extension valving within piston assembly 32 controls the movement of fluid between upper working chamber 44 and lower working chamber 46 during an extension movement of piston assembly 32 within pressure tube 30. Compression valving within piston 32 controls the movement of fluid between lower working chamber 46 and upper working chamber 44 during a compression movement of piston assembly 32 within pressure tube 30.

Figure 3:
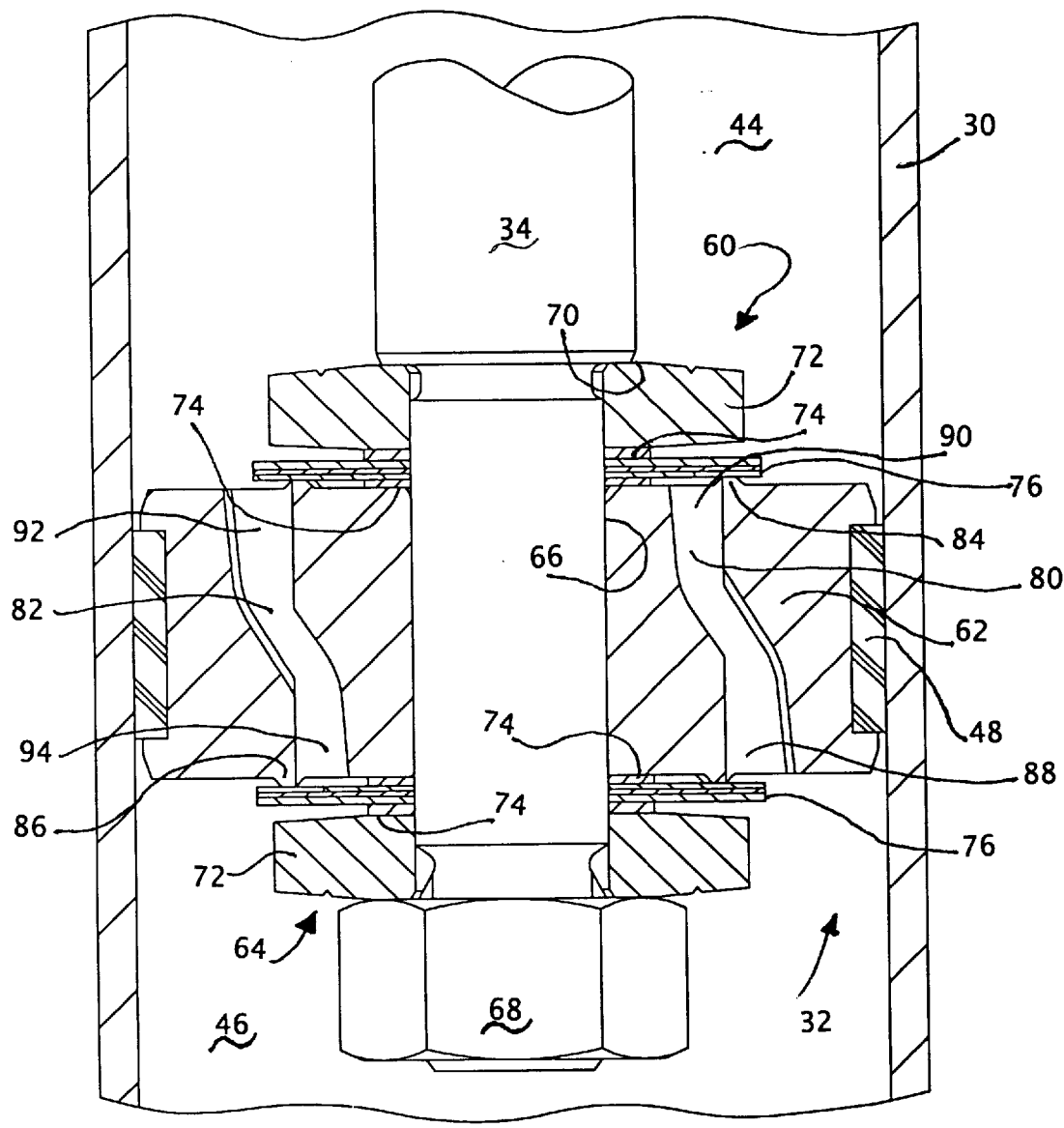
FIG. 3 is an enlarged side view, partially in cross section, of the piston from the shock absorber shown in FIG. 2.
Figure 4:
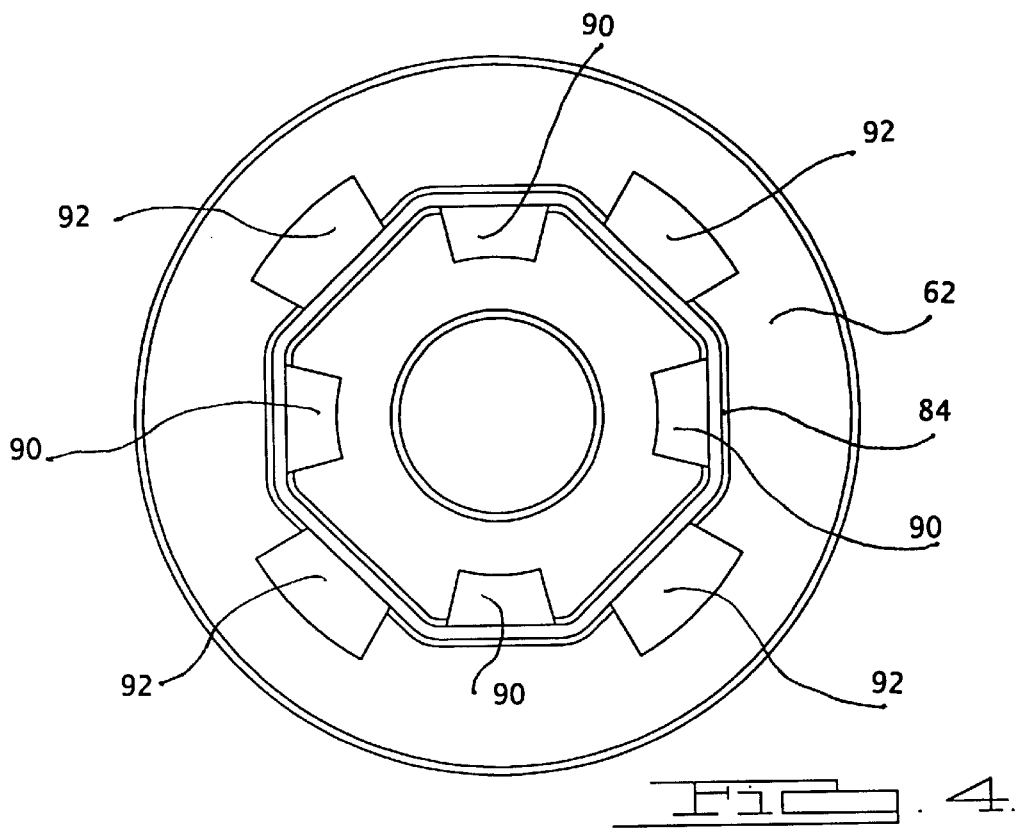
FIG. 4 is a top plan view of the piston shown in FIG. 3.

Referring now to FIGS. 3 and 4, the present invention is directed towards a unique construction for piston assembly 32. Piston assembly 32 comprises a compression valve assembly 60, a piston body 62 and an extension valve assembly 64. Piston rod 34 defines a reduced diameter section 66 onto which compression valve assembly 60, piston body 62 and extension valve assembly 64 are located. A nut 68 secures piston assembly 32 onto section 66 of piston rod 34 with compression valve assembly 60 abutting a shoulder 70 located on piston rod 34, piston body 62 abutting compression valve assembly 60, extension valve assembly 64 abutting piston body 62 and nut 68 abutting extension valve assembly 64.

Compression valve assembly 60 comprises a stop 72, a pair of spacers 74 and a plurality of valve plates 76. In a similar manner, extension valve assembly includes stop 72, the pair of spacers 74 and the plurality of valve plates 76. Thus, compression valve assembly 60 is the same as extension valve assembly 64 which is one advantage provided by the unique design of piston body 62. The commonization of components between compression valve assembly 60 and extension valve assembly 64 reduces the number of different part numbers required for piston assembly 32 which reduces costs by reducing components and complexities for the assembly.

Piston body 62 defines a plurality of compression passages 80, a plurality of extension passages 82, a compression sealing land 84 and an extension sealing land 86. Compression passages 80 are generally S-shaped passages having an inlet 88 at the lower end of piston body 62 positioned radially outward from an outlet 90 at the upper end of piston body 62. This S-shape of compression passages 80 enables valve plates 76 of compression valve assembly 60 to close passages 80 at outlet 90 but also allows inlet 88 to be unaffected by valve plates 76 of extension valve assembly 64. Extension passages 82 are also generally S-shaped passages having an inlet 92 at the upper end of piston body 62 positioned radially outward from an outlet 94 at the lower end of piston body 62. This S-shaped configuration of extension passages 82 enables valve plates 76 of extension valve assembly 64 to close passages 82 at outlet 94 but also allows inlet 92 to be unaffected by valve plates 76 of compression valve assembly 60. Thus, during a compression stroke, fluid in lower working chamber 46 is compressed and fluid flows into inlet 88, through passages 80 to outlet 90 where the fluid pressure flexes valve plates 76 of compression valve assembly 60 to open outlet 90 and allow fluid flow through passages 80. Fluid flow through passages 82 is prohibited by valve plates 76 of extension valve assembly 64 sealing against extension sealing land 86. During an extension stroke, fluid in upper working chamber 44 is compressed and flows into inlet 92, through passages 82 to outlet 94 where the fluid pressure flexes valve plates 76 of extension valve assembly 64 to open outlet 94 and allow fluid flow through passages 82. Fluid flow through passages 80 is prohibited by valve plates 76 of compression valve assembly 60 sealing against compression sealing land 84.

Compression sealing land 84 is a generally octagonally shaped passage which allows for the sealing of outlets 90 of compression passages 80 without affecting inlets 92 of extension passages 82. Extension sealing land 86 has the identical shape to that of compression sealing land 84 but it is rotated or shifted 45° with respect to land 84. This enables the sealing of outlets 94 of extension passages 82 without affecting inlets 88 of compression passages 80.

Figure 5:
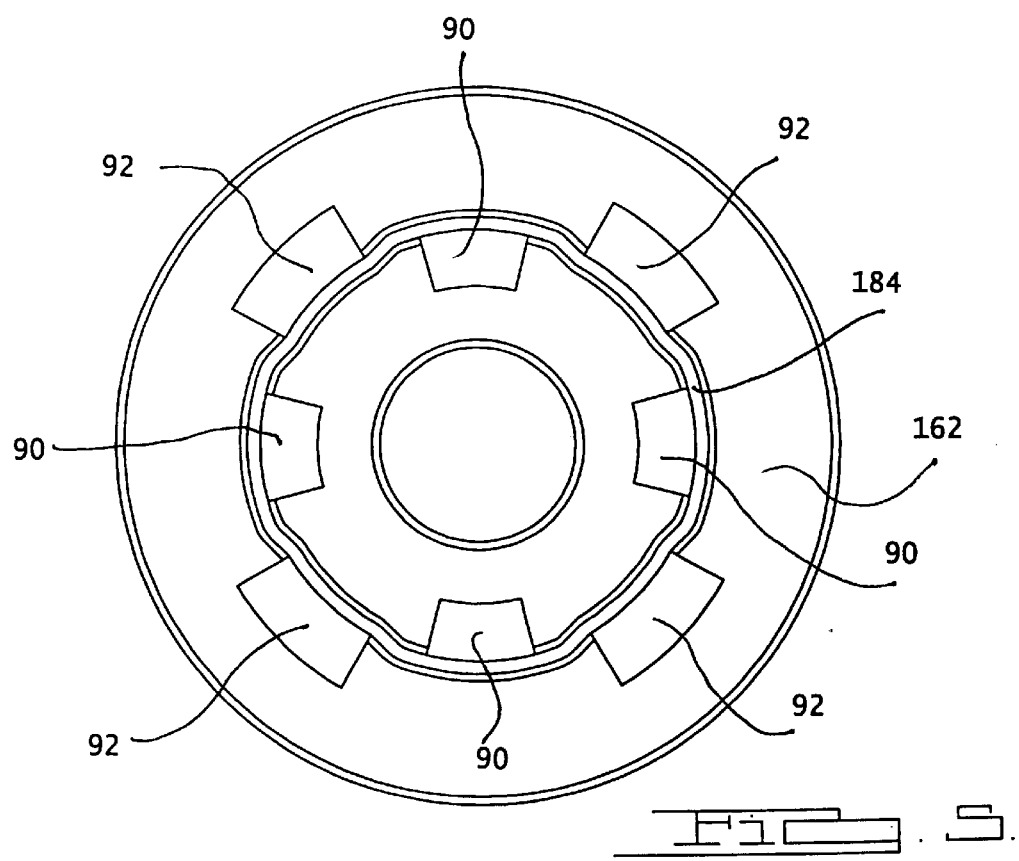
FIG. 5 is a top plan view of a piston in accordance with another embodiment of the present invention.

The S-shaped configuration of passages 80 and 82, the shape of sealing lands 84 and 86 and the overall configuration of piston body 62 enables piston body 62 to be manufactured as a single piece component using powdered metal processes and technology. The powdered metal process produces a blank for manufacturing piston body 62 which requires a minimum amount of machining while eliminating the need to drill or bore fluid passages within piston body 62. This significantly reduces the manufacturing costs associated with piston body 62, Referring now to FIG. 5, a piston body 162 in accordance with another embodiment of the present invention is disclosed. Piston body 162 is the same as piston body 62 except that compression sealing land 84 is replaced by compression sealing land 184 and extension sealing land 86 is replaced by extension sealing land 186. Sealing lands 184 and 186 are generally rectangular in shape rather than being octagonal. Sealing land 186 is the same as sealing land 184 but it is rotated or shifted 45° with respect to sealing land 184. The function and operation of piston body 162 is the same as that desired above for piston body 62.

Figure 6:
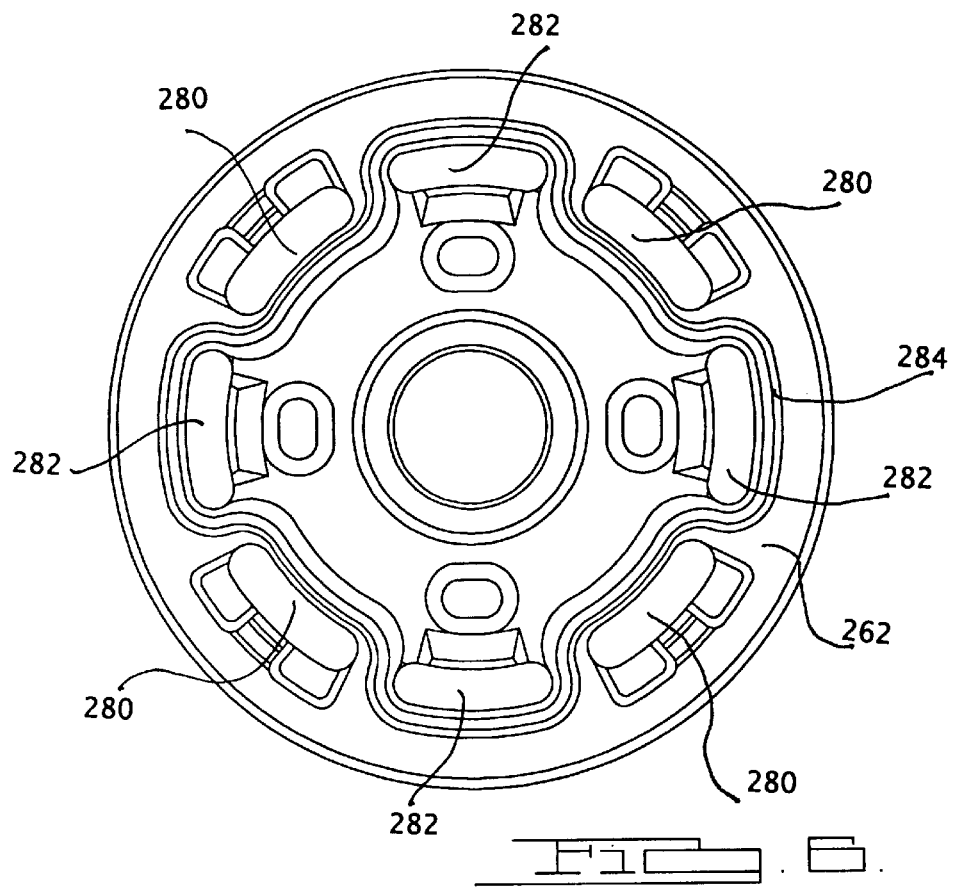
FIG. 6 is a top plan view of a piston in accordance with another embodiment of the present invention.
Figure 7:
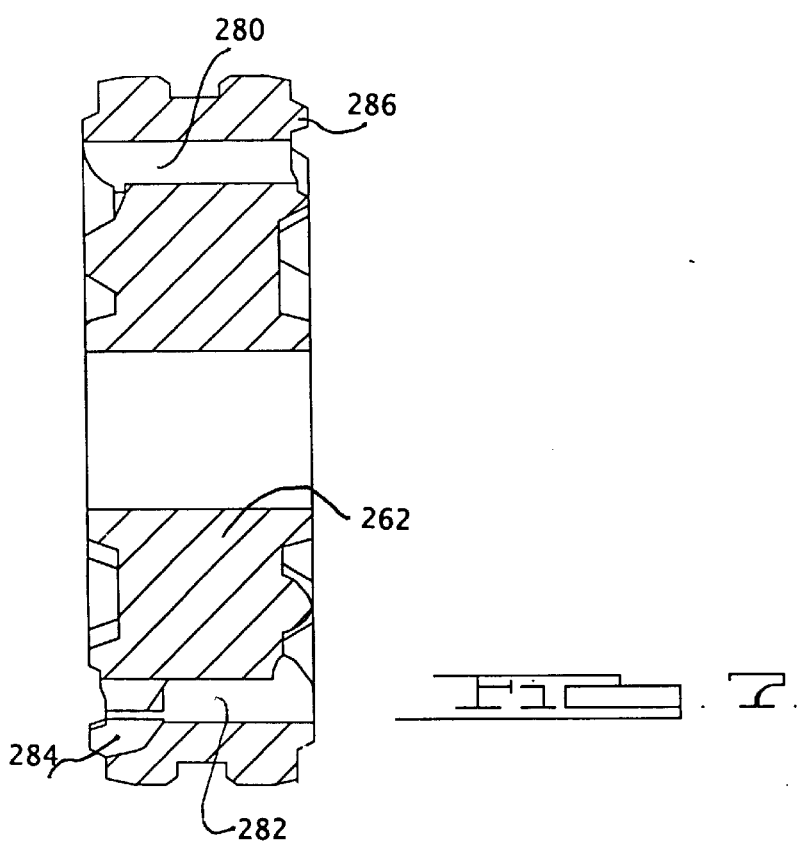
FIG. 7 is a cross-sectional side view of the piston shown in FIG. 6 taken in the direction of arrows 7—7.

Referring now to FIGS. 6 and 7, a piston body 262 in accordance with another embodiment of the present invention is disclosed. Piston body 262 is the same as piston body 62 except that the plurality of compression passages 80 are replaced by a plurality of compression passages 280; the plurality of extension passages 82 are replaced by a plurality of extension passages 282; the compression sealing land 84 is replaced by a compression sealing land 284; and the extension sealing land 86 is replaced by an extension sealing land 286. Passages 280 and 282 extend linearly or straight through piston body 262 and are all located the same radial distances from the center. Passages 280 and 282 are circumferentially spaced around the circumference with passages 280 and 282 alternating around the circumference. Sealing lands 284 and 286 are formed to wind around passages 280 and 282 in a clover leaf shape in order to seal the outlets of the passages while not affecting the inlets of the passages. Again, sealing land 286 is rotated or shifted 45° with respect to sealing land 284. The function and operation of piston body 262 is the same as that described above for piston body 62.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
   a pressure tube forming a working chamber, and defining a tube axis;
   a piston disposed within said working chamber, said piston dividing said working chamber into an upper working chamber and a lower working chamber, said piston comprising:
      a piston body defining a piston axis generally parallel to said tube axis, said piston body being movable along said tube axis;
      a plurality of compression passages extending through said piston body, each of said compression passages defining a compression inlet and a compression outlet, said compression inlet being disposed radially outward from said compression outlet, each of said compression passages including a first portion adjacent said compression inlet parallel with said piston axis and a second portion adjacent said compression outlet parallel with said piston axis said first portion of said compression passage having a first dimension at a first surface of said piston body and a second dimension at a position spaced from said first surface of said piston body, said second dimension being greater than said first dimension, said second portion of said compression passage having a third dimension at a second surface of said piston body and a fourth dimension at a position spaced from said second surface of said piston body, said fourth dimension being greater than said third dimension;
      a plurality of extension passages extending through said piston body, each of said extension passages defining an extension inlet and an extension outlet, said extension inlet being disposed radially outward from said extension outlet, each of said compression passages including a first portion adjacent said extension inlet parallel with said piston axis and a second portion adjacent said extension outlet parallel to said piston axis;
      a compression sealing land disposed on one end of said piston body, said compression sealing land encircling said compression outlets; and
      an extension sealing land disposed on an opposite end of said piston body, said extension sealing land encircling said extension outlets;
      a compression check valve disposed adjacent to said compression sealing land; and
      an extension check valve disposed adjacent to said extension sealing land.

2. The damper according to claim 1 wherein said compression sealing land is generally octagonal in shape.

3. The damper according to claim 2 wherein said extension sealing land is generally octagonal in shape.

4. The damper according to claim 1 wherein said compression sealing land is generally rectangular in shape.

5. The damper according to claim 4 wherein said extension sealing land is generally rectangular in shape.

6. A damper comprising:
   a pressure tube forming a working chamber and defining a tube axis;
   a piston disposed within said working chamber, said piston dividing said working chamber into an upper working chamber and a lower working chamber, said piston comprising:
      a piston body defining a piston axis generally parallel to said tube axis, said piston body being movable along said tube axis;
      a plurality of compression passages extending through said piston body, each of said compression passages defining a compression inlet and a compression outlet, each of said compression passages having a portion which extends parallel to said piston axis said portion of said compression passage having a first dimension at a surface of said piston body and a second dimension at a position spaced from said surface of said piston body, said second dimension being greater than said first dimension;
      a plurality of extension passages extending through said piston body, each of said extension passages defining an extension inlet and an extension outlet, each of said extension passages having a portion which extends parallel to said axis of said piston body;
      a compression sealing land disposed on one end of said piston body, said compression sealing land encircling said compression outlets; and
      an extension sealing land disposed on an opposite end of said piston body, said extension sealing land encircling said extension outlets;
      a compression check valve disposed adjacent to said compression sealing land; and
      an extension check valve disposed adjacent to said extension sealing land.

7. The damper according to claim 6 wherein said compression sealing land is generally clover leaf in shape.

8. The damper according to claim 7 wherein said extension sealing land is generally clover leaf in shape.

9. A piston assembly comprising:
   a piston body having a cylindrical outer surface, said piston body defining a piston axis generally parallel with said cylindrical outer surface;

a plurality of compression passages extending through said piston body, each of said compression passages defining a compression inlet and a compression outlet, said compression inlet being disposed radially outward from said compression outlet, each of said compression passages including a first portion adjacent said compression inlet parallel with said piston axis and a second portion adjacent said compression outlet parallel with said piston axis said first portion of said compression passage having a first dimension at a first surface of said piston body and a second dimension at a position spaced from said first surface of said piston body, said second dimension being greater than said first dimension, said second portion of said compression passage having a third dimension at a second surface of said piston body and a fourth dimension at a position spaced from said second surface of said piston body, said fourth dimension being greater than said third dimension;

a plurality of extension passages extending through said piston body, each of said extension passages defining an extension inlet and an extension outlet, said extension inlet being disposed radially outward from said extension outlet, each of said compression passages including a first portion adjacent said extension inlet parallel with said piston axis and a second portion adjacent said extension outlet parallel to said piston axis;

a compression sealing land disposed on one end of said piston body, said compression sealing land encircling said compression outlets; and an extension sealing land disposed on an opposite end of said piston body, said extension sealing land encircling said extension outlets;

a compression check valve disposed adjacent to said compression sealing land; and an extension check valve disposed adjacent to said extension sealing land.

10. The piston assembly according to claim 9 wherein said compression sealing land is generally octagonal in shape.

11. The piston assembly according to claim 10 wherein said extension sealing land is generally octagonal in shape.

12. The piston assembly according to claim 9 wherein said compression sealing land is generally rectangular in shape.

13. The piston assembly according to claim 12 wherein said extension sealing land is generally rectangular in shape.

* * * * *